United States Patent [19]

Doss

[11] 4,075,388
[45] Feb. 21, 1978

[54] ADHESIVE BONDING OF POLY(ARYLENE SULFIDE) SURFACES

[75] Inventor: Richard C. Doss, Bartlesville, Okla.

[73] Assignee: Phillips Petroleum Company, Bartlesville, Okla.

[21] Appl. No.: 733,606

[22] Filed: Oct. 18, 1976

Related U.S. Application Data

[62] Division of Ser. No. 573,182, April 30, 1975, Pat. No. 4,011,121.

[51] Int. Cl.$^2$ .............. B32B 31/12; B32B 7/12; B32B 31/26; B29C 17/12
[52] U.S. Cl. ............................. 428/297; 156/82; 156/153; 156/322; 427/224; 427/290; 427/299; 427/302; 427/407 R; 428/375; 428/409; 428/419; 428/457; 428/461
[58] Field of Search ............ 428/409, 419, 457, 461, 428/297, 375; 156/82, 153, 154, 322, 182; 427/207 D, 220, 223, 224, 290, 407 R, 407 A, 407 C, 299, 302

[56] References Cited

U.S. PATENT DOCUMENTS

| | | | |
|---|---|---|---|
| 2,747,180 | 5/1956 | Brucker | 156/242 X |
| 2,907,671 | 10/1959 | Duvivier | 427/205 |
| 3,193,424 | 7/1965 | Scott | 156/153 X |
| 3,354,129 | 11/1967 | Edmonds et al. | 260/79 X |
| 3,616,186 | 10/1971 | Blackwell | 428/419 |
| 3,620,402 | 11/1971 | Wentland | 156/82 X |
| 3,622,376 | 11/1971 | Tieszen et al. | 428/409 X |
| 3,634,125 | 1/1972 | Tieszen | 427/223 |
| 3,879,238 | 4/1975 | Bierman et al. | 156/82 X |
| 3,948,865 | 4/1976 | Brady et al. | 427/302 X |

*Primary Examiner*—Harold Ansher

[57] ABSTRACT

Pretreating a first solid surface consisting of a material selected from the group consisting of unfilled poly(arylene sulfide) and fiberglass-filled poly(arylene sulfide) by mechanically roughening this first surface or, in the alternative, pretreating with flame a first solid surface of unfilled poly(arylene sulfide) greatly increases the lap shear strength of an adhesive bond of such a first poly(arylene sulfide) surface to a second solid surface as compared to the same bond without pretreatment of the poly(arylene sulfide) surface.

9 Claims, No Drawings

ADHESIVE BONDING OF POLY(ARYLENE SULFIDE) SURFACES

This is a divisional application of my copending patent application, Ser. No. 573,182 filed Apr. 30, 1975, now U.S. Pat. No. 4,011,121.

This invention relates to the adhesive-bonding of two surfaces. In one of its more specific aspects, this invention relates to bonding two surfaces to each other by applying a layer of polymer material between them. In another aspect, this invention relates to the adhesive-bonding of a first solid surface of poly(arylene sulfide) to a second solid surface.

BACKGROUND OF THE INVENTION

One of the most promising resins developed in recent years is poly(arylene sulfide). This resin exhibits astonishing properties in its behavior against chemicals as well as in its thermal properties. In addition, this resin has mechanical properties heretofore unknown for polymer materials. It would be very desirable to have a process available by which poly(arylene sulfide) can be effectively bonded to other surfaces.

THE INVENTION

It is one object of this invention to provide a new process for adhesive-bonding of two solid surfaces.

A more specific object of this invention is to provide a process for bonding a metal surface to another solid surface, particularly another metal surface.

A further object of this invention is to provide a process for adhesive bonding a first solid surface of unfilled poly(arylene sulfide) to another surface.

Still another object of this invention is to provide a process for adhesive-bonding a first solid surface of unfilled poly(arylene sulfide) to a second solid surface resulting in a bond with high lap shear strength.

Still another object of this invention is to provide a new laminate.

These and other objects, embodiments, advantages, details and features of this invention will become apparent to those skilled in the art from the following detailed description of the invention, the examples, and the appended claims.

In accordance with one embodiment of this invention, a first solid surface is bonded to a second solid surface by covering said first solid surface with a material selected from the group consisting of unfilled poly(arylene sulfide) and fiberglass-filled poly(arylene sulfide) to produce a first poly(arylene sulfide) surface, mechanically roughening said first poly(arylene sulfide) surface and adhesive-bonding said roughened first poly(arylene sulfide) surface to said second solid surface.

In accordance with another embodiment of this invention, a first solid surface is strongly bonded to a second solid surface by covering said first solid surface with unfilled poly(arylene sulfide) to produce a first solid poly(arylene sulfide) surface, flame-treating said first poly(arylene sulfide) surface and adhesive-bonding said first poly(arylene sulfide) surface to said second solid surface.

In accordance with a further embodiment of this invention, said second solid surface is also covered with a material selected from the group consisting of unfilled poly(arylene sulfide) and fiberglass-filled poly(arylene sulfide) to produce a second poly(arylene sulfide) surface, said second poly(arylene sulfide) surface is mechanically roughened and thereafter adhesive-bonded to said first poly(arylene sulfide) surface.

In accordance with a still further embodiment of this invention, said second solid surface is covered with unfilled poly(arylene sulfide) to produce a second poly(arylene sulfide) surface, this second poly(arylene sulfide) surface is flame-treated and thereafter adhesive-bonded to said first poly(arylene sulfide) surface.

The embodiments of this invention described above result in a strong mechanical bond between two solid surfaces. In addition, the method described makes possible an adhesive-bonding of the two solid surfaces, although one or both of these solid surfaces may be incompatible with the adhesive employed. One solid surface, for instance, may be soluble in the adhesive used. The poly(arylene sulfide) is extremely resistant to many chemicals so that the poly(arylene sulfide) surface constitutes an effective protection of the covered surface against the adhesive. At the same time, the poly(arylene sulfide) results in a strong bond so that none of the properties of the bond have to be sacrificed.

In accordance with still another embodiment of this invention, a first solid surface of unfilled poly(arylene sulfide) is adhesive-bonded to a second solid surface resulting in a bond of high lap shear strength by flame-treating the first solid surface of unfilled poly(arylene sulfide) and thereafter adhesive-bonding said first solid surface to said second solid surface.

In accordance with still a further embodiment of this invention, the second solid surface, which is adhesive-bonded to the flame-treated first solid surface of unfilled poly(arylene sulfide), is selected from the group consisting of flame-treated surfaces of unfilled poly(arylene sulfide), mechanically roughened surfaces of unfilled poly(arylene sulfide) and mechanically roughened surfaces of fiberglass-filled poly(arylene sulfide).

In accordance with still another embodiment of this invention, there is provided a laminate which comprises three layers. The first layer consists essentially of unfilled poly(arylene sulfide) having a flame-treated surface connected to the second layer. The second layer consists of an adhesive material and is connected to the third layer. The third layer is a solid surface connected to the adhesive layer.

In accordance with another embodiment of this invention, the third layer of said laminate is selected from the group consisting of unfilled poly(arylene sulfide) having a flame-treated surface connected to said adhesive, unfilled poly(arylene sulfide) having a mechanically roughened surface connected to said adhesive, and fiberglass-filled poly(arylene sulfide) having a mechanically roughened surface connected to said adhesive.

Still another embodiment of this invention provides a new laminate of four layers. The first layer is a solid material coated with a second layer of poly(arylene sulfide) having a surface facing the third layer, which surface is selected from the group consisting of flame-treated surfaces of unfilled poly(arylene sulfide), mechanically roughened surfaces of unfilled poly(arylene sulfide), and mechanically roughened surfaces of fiberglass-filled poly(arylene sulfide). The third layer consists of an adhesive material which contacts on the one side the flame-treated or mechanically roughened poly(arylene sulfide) and on the other side the fourth layer. This fourth layer consists of solid material.

The three-layer laminates as well as the four-layer laminates of this invention can be used for electrical insulating purposes as well as for heat insulating purposes. The laminates exhibit particular advantages when applications involving high temperatures are concerned. Such laminates, as far as the poly(arylene sulfide) is concerned, can stand temperatures of up to about 500° F. In addition, such laminates have excellent mechanical properties, in particular, show a high strength. Therefore, these laminates, in addition to their insulating function, can also be used in mechanical constructions where the laminate itself has a mechanical function.

The poly(arylene sulfide) employed in accordance with this invention comprises a resin known in the art and containing repeating groups such as —aryl-S—. The presently preferred poly(arylene sulfide) is poly(p-phenylene sulfide). This resin is commercially available under the trademark Ryton from Phillips Petroleum Company, Bartlesville, Okla. The poly(arylene sulfide), as well as methods to make it, are described in U.S. Pat. No. 3,354,129.

The poly(arylene sulfide) surfaces can be on solid objects molded from poly(arylene sulfide), on objects coated with poly(arylene sulfide), on laminates of poly(arylene sulfide) with solid materials such as fiberglass, fabric, cloth, etc., or articles made from poly(arylene sulfide) which is either unfilled or filled with chopped fiberglass, as well as on any other suitable type of material possessing a cured or uncured poly(arylene sulfide) surface. The presently preferred polymer is the poly(p-phenylene sulfide) resin either unfilled or filled with about 5 to about 60 weight percent of chopped glass fibers.

In the present context, cured poly(arylene sulfide) resin or a coating made from this resin is one which has been heat-treated for a time and at a temperature which are sufficient to increase the melt viscosity of the resin or the toughness of the coating. The typical cure procedure is heat-treating the resin for 1 hour at 260° C (500° F).

The solid surface which is covered with poly(arylene sulfide) in accordance with one embodiment of this invention can be any solid surface which can be covered with poly(arylene sulfide). Presently preferred solid surfaces are metal surfaces consisting, e.g., of a metal selected from the group consisting of steel, aluminum and copper.

The second solid surface to which the pretreated poly(arylene sulfide) surface is adhesive-bonded and the third layer of the three layer laminate and the fourth layer of the four layer laminate can be any solid substrate. This solid surface can, for instance, consist of a metal such as steel, aluminum or copper, a plastic material such as polyethylene, polypropylene, polyvinyl chloride, acrylonitrile-butadiene-styrene resin, polystyrene, etc. The surface can also consist of wood, ceramic material, glass or concrete. It may be desirable to pretreat the second surface in order to improve adhesion. Examples of such treatment include mechanical roughening, heat-treatment, solvent-treatment, a treatment with a primer, etc.

The mechanical roughening of both the unfilled poly(arylene sulfide) and the fiberglass-filled poly(arylene sulfide) surfaces can be accomplished by any known method of mechanical roughening. Examples for such methods are hand- or machine-sanding, scrubbing with steel wool, grit blasting, etc. The mechanical roughening is conveniently carried out until the luster of the poly(arylene sulfide) surface dulls. Another possibility of determining whether the mechanical treatment has sufficiently roughened the poly(arylene sulfide) surface is to contact the treated surface with water and to continue the mechanical roughening until the treated surface is wettable by water. The poly(arylene sulfide) surface is water-wettable when a thin film of water lies on the surface fairly uniformly and without "beading". The presently preferred mechanical roughening step is a grit-blasting or a machine-sanding step.

The flame pretreatment of the unfilled poly(arylene sulfide) surface is done by contacting this surface of unfilled poly(arylene sulfide) with one or more flames. These flames can be any gas-oxygen flames; however, propane, butane, or natural gas flames are presently preferred. The flame-treatment of the unfilled poly(arylene sulfide) surface will be carried out for a time sufficient to reach the desired degree of bonding strength. This flame-treatment of the unfilled poly(arylene sulfide) surface will usually be carried out until the luster of the unfilled poly(arylene sulfide) surface dulls but will generally not be carried out long enough to melt, pyrolyze, burn or otherwise substantially alter the surface of unfilled poly(arylene sulfide). The actual duration of the flame treatment is dependent upon the particular surface being treated and on the desired degree of bonding strengths. Normally, a flame treatment of from 0.1 to 5 seconds is adequate to produce the desired results, a duration of about 1 to about 3 seconds being presently preferred for the flame treatment.

For the purposes of this invention, any adhesive which provides the desired bond strength between the poly(arylene sulfide) surface and the second surface can be used. Examples of useful types of adhesives which are commercially available include adhesives on epoxy basis, cyanoacrylate basis, polysulfone basis, rubber basis, polyamide basis and silicone basis. These adhesives can be applied to the poly(arylene sulfide) surface or to the second surface as a blend, a mixture, a solution, an emulsion or as hot melt. The thickness of the adhesive film is determined in accordance with the desired bond strength. The presently preferred adhesives are those on the bases of epoxy, polysulfone and cyanoacrylate. These adhesives confer particularly high bond strength to the adhesive bonds between the poly(arylene sulfide) surface and the second surface.

The treated poly(arylene sulfide) surface and the second surface to be bonded thereto are sandwiched with the selected adhesive between them and are contacted and kept in the contacted condition for a time and under temperature and pressure conditions to effect the desired bonding. The temperature employed depends upon the type of adhesive and will be generally below the decomposition temperature, melting or softening point, etc., of the poly(arylene sulfide) and the second surface. These bonding temperatures fall in the range of about 0° C to about 375° C and preferably are in the range of about 25° to about 200° C.

To bond the two surfaces together, pressure can be applied. Pressure from up to about 10,000 psig can be used. It is, however, generally preferred to employ pressure near atmospheric pressure, i.e. of up to about 20 psig.

The time to fix the bonding depends upon the type of adhesive and the temperature employed. These bonding times usually are in the range of about 1 minute to 48 hours. Times in the range of 5 minutes to 24 hours are preferred.

The invention will be more fully understood from the following examples showing preferred embodiments of this invention being, however, not intended to limit the scope of protection.

EXAMPLE I

Coupons of 1 × 4 inches size were cut from a 0.065 inch thick aluminum metal sheet. These coupons were cleaned in an aqueous chromic acid solution, rinsed in water and dried. A poly(p-phenylene sulfide) powder having a melt flow of about 6,000 to about 7,000 (measured in accordance with ASTM D 1238-70 used with the modification of operating at 316° C and a weight of 5 kilograms) was dispersed in propylene glycol to give a dispersion having 40 weight percent of poly(p-phenylene sulfide) therein. This dispersion was applied to the aluminum coupons. The coated coupons were dried for about 15 minutes in air of about 316° C in order to remove the propylene glycol. The resulting poly(p-phenylene sulfide) coating was about 0.001 to about 0.002 inch thick. These samples are referred to as samples V in the following Tables I and II.

Another set of samples was prepared by heating the same poly(p-phenylene sulfide) powder described above to a temperature of about 260° C in air for a time sufficient to reduce the melt flow of the polymer from 6000 to 7000 down to a value of about 50. The polymer was then melted and intimately mixed with chopped glass fibers to result in polyphenylene sulfide filled with about 40 weight percent of chopped glass fiber. The glass fibers used herein were chopped fibers commercially available as a filler material under the designation K-497AA by Owens-Corning Fiberglas Corp. From the material just described, slabs were formed and these were cut into 1 × 4 inches coupons being 0.125 inch thick. These coupons are referred to as samples R in the following Tables I and II.

Five of the samples V and R were treated in a Clemco dry blast apparatus (Model MCDFM made by Clemco, Clementina, Ltd.) with a 100 mesh (US sieve) grit and blasted against the poly(p-phenylene sulfide) surface for about 1 to about 2 seconds. The other samples were either not treated at all or pretreated by immersing them into concentrated nitric acid for 5 minutes at 70° C (in Tables I and II referred to as "nitric acid") or by immersing them into a solution of 30 grams sodium dichromate, 300 grams concentrated sulfuric acid and 90 grams deionized water for 15 minutes at 70° C (referred to as "chromic acid" in Tables I and II) and then rinsed and dried in both instances.

As a second surface 0.065 inch thick aluminum coupons of 1 × 4 inches were cut, cleaned with chromic acid, and rinsed with water and dried. About 1 square inch of these coupons was covered with a layer of adhesive of about 0.005 to about 0.01 inch thickness. The samples with the poly(p-phenylene sulfide) surface were then applied to the adhesive-covered aluminum coupons so that the surfaces overlapped in an area of about 0.5 square inch.

The adhesive used for the samples in runs Nos. 1 to 8 was an epoxide/tetraester adhesive consisting of a mixture of 9.5 grams of an epoxide composition (commercially available under the trade name Epon 828 from Shell Chemical Co.*), 6.5 grams pentaerithrytol tetra-3-mercaptopropionate and 0.1 gram tris(dimethylaminomethyl)phenol. The adhesive bond (sandwiched) was cured for 3 hours at 25° C and for 8 hours at 100° C. This bond and adhesive is referred to as "epoxide/tetraester" in Table I.

*Epon Resins are produced by condensation of epichlorohydrin with bisphenol A. Epon 828 is a lower molecular weight epoxy resin.

The adhesive used for the samples in runs 9 and 10 was commercially available cyanoacrylate-based adhesive Locktite 04E (manufactured and sold by Locktite Corporation). The bond was cured 5 minutes at 25° C under slight pressure. This adhesive and the bond is referred to in the following Table I as "cyanoacrylate".

For the samples of runs 11 and 14, the epoxy-based adhesive which is commercially available under the trademark Hysol epoxy patch (manufactured and sold by the Hysol Chemical Corporation) was used. The bond was cured at 25° C for 2 hours and at 70° C for 2 hours. This adhesive and bond is referred to in Table I as "epoxy".

The lap shear strength of the bonds thus prepared was then measured in an Instron Model T instrument with a cross head speed of 0.05 inch/minute in accordance with the standard test method ASTM-D-1002-53T. All failures that occurred with the coated samples V were found to occur at the adhesively bonded poly(p-phenylene sulfide)/aluminum interface.

The results of the lap shear strength measurements are shown in the following Table I.

TABLE I

| Run No. | Adhesive | Poly(p-phenylene Sulfide) Sample | Pretreatment | Lap Shear Strength (lbs/in$^2$) |
|---|---|---|---|---|
| 1 (Comp.) | Epoxy/teraester | R | None | 330 |
| 2 (Comp.) | " | R | Nitric acid | 420 |
| 3 (Comp.) | " | R | Chromic acid | 370 |
| 4 (Inv.) | " | R | Grit blast | 1520 |
| 5 (Comp.) | " | V | None | 660 |
| 6 (Comp.) | " | V | Nitric acid | 540 |
| 7 (Comp.) | " | V | Chromic acid | 230 |
| 8 (Inv.) | " | V | Grit blast | 1910 |
| 9 (Comp.) | Cyanoacrylate | R | None | 540 |
| 10 (Inv.) | " | R | Grit blast | 1380 |
| 11 (Comp.) | Epoxy | R | None | 270 |
| 12 (Inv.) | " | R | Grit blast | 900 |
| 13 (Comp.) | " | V | None | 390 |
| 14 (Inv.) | " | V | Grit blast | 920 |

The results in Table I show that grit-blasting of both filled and unfilled poly(p-phenylene sulfide) surfaces resulted in greater bond strength as compared to adhesive bonds using the untreated poly(p-phenylene sulfide) surface or this surface with only a pretreatment with nitric acid or chromic acid.

EXAMPLE II

With one sample V and one sample R prepared as described above in connection with Example I, the following experiment was carried out. The two samples were each held in the flame tip of a propane-oxygen hand torch for about 1 to 3 seconds until the surface gloss was noticeably diminished. The adhesive and curing used were the same as described above in connection with the epoxy/tetraester adhesive. Thus, two adhesive bonds between poly(p-phenylene sulfide) comprising the surfaces and aluminum were made. The lap shear strength of these bonds was measured as described above. The results of these measurements are shown in the following Table II together with the results of the comparative runs of Example I.

TABLE II

| Run No. | Pretreatment | Poly(p-phenylene sulfide) Sample | Lap shear strength (lbs/in²) |
| --- | --- | --- | --- |
| 5 (Comp.) | None | V | 660 |
| 6 (Comp.) | Nitric acid | V | 540 |
| 7 (Comp.) | Chromic acid | V | 230 |
| 15 (Inv.) | Flame treatment | V | 1250 |
| 1 (Comp.) | None | R | 330 |
| 2 (Comp.) | Nitric acid | R | 420 |
| 3 (Comp.) | Chromic acid | R | 370 |
| 16 | Flame treatment | R | 210 |

The results in Table II show that flame treatment of the surface of unfilled poly(p-phenylene sulfide) improved the bond strength of an adhesive bond between the poly(p-phenylene sulfide) and aluminum as compared to an adhesive bond starting either from an untreated poly(p-phenylene sulfide) surface or such a surface after having been pretreated with nitric acid or chromic acid. Surprisingly, however, the fiberglass-filled poly(p-phenylene sulfide) surface, after having been flame-treated, did not at all exhibit a higher lap shear strength in the adhesive bond. Rather, the lap shear strength this time was reduced as compared to an adhesive bond made from a non-pretreated poly(p-phenylene sulfide) surface or such a surface after pretreatment with nitric acid or with chromic acid.

Reasonable variations and modifications which will be apparent to those skilled in the art can be made with this invention without departing from the spirit and scope thereof.

I claim:

1. A laminate structure comprising three layers, the first layer consisting essentially of unfilled poly(arylene sulfide) having a flame-treated surface facing the second layer, the second layer consisting of an adhesive connected to said flame-treated surface, and said third layer consisting of a solid material connected to said second layer of adhesive, said third layer being selected from the group consisting of metals, plastic materials, wood, ceramic materials, glass and concrete.

2. A laminate in accordance with claim 1 wherein said poly(arylene sulfide) is poly(p-phenylene sulfide).

3. A laminate in accordance with claim 1 wherein said third layer is a metal layer.

4. A laminate structure comprising four layers, the first layer consisting of a solid material being covered with the second layer consisting essentially of poly(arylene sulfide) and having a surface facing the third layer, which surface is a flame-treated or mechanically roughened unfilled poly(arylene sulfide) surface and is connected to the third layer consisting essentially of an adhesive material which in turn is connected to the fourth layer consisting of a solid material selected from the group consisting of metals, plastic materials, wood, ceramic materials, glass and concrete.

5. A laminate in accordance with claim 4 wherein said first layer is a metal surface.

6. A laminate in accordance with claim 4 wherein the surface of said fourth layer is a metal surface.

7. A laminate structure in accordance with claim 6 wherein said first and said fourth layers consist of a metal.

8. A laminate in accordance with claim 6 wherein said poly(arylene sulfide) is poly(p-phenylene sulfide).

9. A laminate structure comprising four layers, the first layer consisting of a solid material being convered with the second layer consisting essentially of fiberglass-filled poly(arylene sulfide) having a mechanically roughened surface facing and being connected to the third layer which consists essentially of an adhesive which in turn is connected to the fourth layer consisting of a solid material selected from the group consisting of metals, plastic materials, wood, ceramic materials, glass and concrete.

* * * * *